United States Patent
Balakrishnan et al.

(10) Patent No.: US 6,763,382 B1
(45) Date of Patent: Jul. 13, 2004

(54) METHOD AND APPARATUS FOR DEMAND BASED PAGING ALGORITHM

(75) Inventors: Ravi Balakrishnan, Sunnyvale, CA (US); Abhay Gupta, Los Altos, CA (US); Suresh Pentyala, Milpitas, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/528,092

(22) Filed: Mar. 17, 2000

(51) Int. Cl.⁷ .............................. G06F 17/21; H01H 1/00
(52) U.S. Cl. ..................... 709/224; 709/227; 345/784
(58) Field of Search ..................... 709/203, 206, 709/201, 223, 224, 229, 227, 226, 228, 232, 2

(56) References Cited

U.S. PATENT DOCUMENTS

| | | | | |
|---|---|---|---|---|
| 5,754,938 A | * | 5/1998 | Herz et al. ................... 455/4.2 |
| 6,091,835 A | * | 7/2000 | Smithies et al. ............ 382/115 |
| 6,101,510 A | * | 8/2000 | Stone et al. ................. 715/513 |
| 6,173,406 B1 | * | 1/2001 | Wang et al. ................. 713/201 |
| 6,233,618 B1 | * | 5/2001 | Shannon ..................... 709/229 |
| 6,253,188 B1 | * | 6/2001 | Witek et al. .................. 705/14 |
| 6,263,361 B1 | * | 7/2001 | Hoyer et al. ................. 709/203 |
| 6,317,786 B1 | * | 11/2001 | Yamane et al. ............. 709/224 |
| 6,363,421 B2 | * | 3/2002 | Barker et al. ............... 709/223 |

* cited by examiner

*Primary Examiner*—Frantz B. Jean
*Assistant Examiner*—Khanh Quang Dinh
(74) *Attorney, Agent, or Firm*—Peter J. Meza; William J. Kubida; Hogan & Hartson LLP (57) ABSTRACT

A method of demand based retrieval of a data file including pages of data, in a network system having a remote host system interconnected to at least one local host system via a first communication link, and one or more end-user systems interconnected to the local host system via a second communication link. A cache buffer is maintained in the local host system for storing a plurality of data pages. Upon receiving a request from an end-user system for the data file, the cache buffer is checked to determine if one or more data pages currently referenced by the request are available therein. If so, one or more of the available data pages are transmitted from the cache buffer to the end user system. Otherwise, the referenced pages are retrieved from the remote host system to the local host system via the first communication link, stored in the cache buffer in the local host system, and transmitted to the end-user system via the second communication link.

31 Claims, 6 Drawing Sheets

SEARCH REPORT FOR: [    ] [SEARCH]

EXPENSE DISTRIBUTION DETAIL REPORT

|  | FROM: | TO: |
|---|---|---|
| COMPANY | D-M-Y | D-M-Y |
| BUSINESS UNIT | D-M-Y | D-M-Y |
| DEPARTMENT | D-M-Y | D-M-Y |
| ACCOUNT | D-M-Y | D-M-Y |

EXPENSE DISTRIBUTION DETAIL

START DATE: D-M-Y
END DATE: D-M-Y

ACCOUNTING    VENDOR    INVOICE

USE    DESCRIPTION

[SAVE] [PRINT] [CANCEL]

Fig. 4

FILE REPORT

FILE NAME

REPORT

Fig. 6

METHOD AND APPARATUS FOR DEMAND BASED PAGING ALGORITHM

BACKGROUND OF THE INVENTION

1. Field of the Invention

The present invention relates to data communication over a network system, and more particularly, to efficient transfer of data from a server system to a client system over the network.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, HotJava Views and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

The Internet (or "World Wide Web") is used to obtain information from different web sites all over the world. Sometimes users in different parts of the world need to access the same file, requiring the file to be sent to two different places. It is not efficient to send the same data to two or more different places. This problem and others can be understood by the following review of the operation of the Internet and the way in which files are transferred over the internet.

The Internet

The Internet is a worldwide network of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, read information from, download a file from or send an electronic mail message to another computer/client using the Internet.

To retrieve a file or service on the Internet, a client must search for the file or service, make a connection to the computer on which the file or service is stored, and download the file or service. Each of these steps may involve a separate application and access to multiple, dissimilar computer systems. The World Wide Web (WWW) was developed to provide a simpler, more uniform means for accessing information on the Internet.

The components of the WWW include browser software, network links, servers. and WWW protocols. The browser software, or browser, is a user-friendly interface (i.e., front-end) that simplifies access to the Internet. A browser allows a client to communicate a request without having to learn a complicated command syntax, for example. A browser typically provides a graphical user interface (GUI) for displaying information and receiving input. Examples of browsers currently available include Mosaic, Netscape Navigator and Communicator, Microsoft Internet Explorer, and Cello.

Information servers maintain the information on the WWW and are capable of processing a client request. Hypertext Transport Protocol (HTTP) is the standard protocol for communication with an information server on the WWW. HTTP has communication methods that allow clients to request data from a server and send information to the server.

To submit a request, the client contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request therefore, consists of establishing a connection between the client and the HTTP server, performing the request, and terminating the connection. The HTTP server does not retain any information about the request after the connection has been terminated. HTTP is, therefore, a stateless protocol. That is, a client can make several requests of an HTTP server, but each individual request is treated independent of any other request. The server has no recollection of any previous request.

An addressing scheme is employed to identify Internet resources (e.g., HTTP server, file or program). This addressing scheme is called Uniform Resource Locator (URL). A URL contains the protocol to use when accessing the server (e.g., HTTP), the Internet domain name of the site on which the server is running, the port number of the server, and the location of the resource in the file structure of the server.

The WWW uses a concept known as hypertext. Hypertext provides the ability to create links within a document to move directly to other information. To activate the link, it is only necessary to click on the hypertext link (e.g., a word or phrase). The hypertext link can be to information stored on a different site than the one that supplied the current information. A URL is associated with the link to identify the location of the additional information. When the link is activated, the client's browser uses the link to access the data at the site specified in the URL.

If the client request is for a file, the HTTP server locates the file and sends it to the client. An HTTP server also has the ability to delegate work to gateway programs. The Common Gateway Interface (CGI) specification defines a mechanism by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data and returns its response to the server using CGI (via standard input, for example). The server forwards the data to the client using the HTTP.

A browser displays information to a client/user as pages or documents (referred to as "web pages" or "web sites"). A language is used to define the format for a page to be displayed in the WWW. The language is called Hypertext Markup Language (HTML). A WWW page is transmitted to a client as an HTML document. The browser executing at the client parses the document and displays a page based on the information in the HTML document.

HTML is a structural language that is comprised of HTML elements that are nested within each other. An HTML document is a text file in which certain strings of characters, called tags, mark regions of the document and assign special meaning to them. These regions are called HTML elements. Each element has a name, or tag. An element can have attributes that specify properties of the element. Blocks or components include unordered list, text boxes, check boxes, radio buttons, for example. Each block has properties such as name, type, and value. The following provides an example of the structure of an HTML document:

```
<HTML>
  <HEAD>
    ... element(s) valid in the document head
  </HEAD>
  <BODY>
    ... element(s) valid in the document body
  </BODY>
</HTML>
```

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker. The ending marker is identified by the inclusion of an another character, "/" that follows the "<" character.

HTML is a hierarchical language. With the exception of the HTML element, all other elements are contained within another element. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed. Other HTML elements are described in HTML reference manuals.

Communication and File Transfer on the Web

Files and data are stored at web servers and are made available to clients that log onto the web servers. When a client logs onto a web site, they are actually logged onto a web server. The servers and clients are connected by communication paths, including telephone lines. When a client requests a file or other data, it is transmitted from the server to the client over the communications paths. Clients that are logged onto other servers may be sharing some or all of the communications path. There is a limited amount of data that can be transmitted over the communications path at any one time. The amount of data that can be transmitted over a path is known as the bandwidth of the path. If many clients request data, the bandwidth of the path can be exceeded, so that data transfer becomes slower. Thus, each request for data has an associated cost in bandwidth usage. Where several end-user systems request the same data file from the web-server, the entire data file is transmitted over the transmission network for each end-user system. As the number of users corresponding to each web-server increases, the bandwidth drain and network degradation worsen substantially.

A further disadvantage of conventional data transfer methods is that often the user only needs to view a small portion of the data file, making transmission of the entire data file to the user's system unnecessary. Further, since the entire data file is transmitted unconditionally, the user must often wait until the entire data file transmission is complete before viewing desired portions of the data. This degrades system performance and negatively impacts the client experience.

There is also a cost associated with the particular data path that is used for communication. A path that includes communication between countries, an "international" segment, is more expensive than a path that is domestic. Another problem is that many end-user systems are so-called "thin-clients" with limited memory and storage space, unsuited for receiving and storing large amounts of data. For such clients, receiving large files when only a small portion in needed is inefficient at best and impossible at worse. For example, a report may be a large file (e.g. 200 plus megabytes) and may be placed on a server for access. A user may only need to use a few pages of the report. It would be ineffcient for the user to download the entire report if the user only needs to view a few pages of the report. Not only is there a waste of bandwidth associated with transferring such a large file, but the user would be required to have that much free memory to store the file.

SUMMARY OF THE INVENTION

The present invention provides a method of demand based retrieval of a data file comprising pages of data. The method of the present invention can be implemented in a network system comprising a remote host system interconnected to at least one end-user system via a second communication link. The retrieval method includes the steps of: (a) receiving a request from an end-user system for the data file; (b) determining one or more data pages currently referenced by the request; (c) retrieving the one or more referenced data pages from the remote host system; (d) transmitting the retrieved data pages to the end user system via the communication link; and (e) transmitting additional pages as demanded by an end user system.

The remote host system can store a plurality of data files each comprising pages of data, and the retrieval method can further include providing information to said end-user systems for identifying each of said data files on the remote host system, and allowing selection of one or more of said identified data files. At least one end-user system can include display means, and the step of selecting a data file can further include displaying one or more pages of the data file on said display means.

In another embodiment, the method of the present invention can be implemented in a network system comprising a remote host system interconnected to at least one local host system via a first communication link, and one or more end-user systems interconnected to the local host system via a second communication link.

The retrieval method comprises the steps of: (a) receiving a request from an end-user system for the data file; (b) determining whether one or more data pages currently referenced by the request are available in the cache buffer in the local host system; and if so (1) transmitting one or more available data pages from the cache buffer to the end user system, otherwise (2) retrieving the referenced pages from the remote host system to the local host system via the first communication link, (3) storing the referenced pages in the cache buffer in the local host system, and (4) transmitting the referenced pages from the local host system to the end-user system via the second communication link.

The remote host system can store a plurality of data files each comprising pages of data, and the retrieval method can further include providing information to said end-user systems for identifying each of said data files on the remote host system, and allowing selection of one or more of said identified data files. At least one end-user system can include display means, and the step of selecting a data file can further include displaying one or more pages of the data file on said display means.

In another aspect, the present invention provides a demand based paging system comprising: (a) a remote host system storing a data file including pages of data; (b) at least one local host system interconnected to the remote host system via a first communication link; (c) one or more end-user systems interconnected to the local host system via a second communication link; (d) a cache buffer in the local host system for storing a plurality of data pages; and (e) a request processor configured to receive a request from an enduser system for the data file.

The remote host system can store a plurality of data files each comprising pages of data, and said paging system can further comprise a user interface for each end-user system, wherein each user interface is configured to (1) provide information to the corresponding end-user system for identifying each of said data files on the remote host system, (2) allow selection of one or more of said identified data files, and (3) and generate requests for the selected data files. Each user interface can further be configured to display one or more pages of a selected data file on a display means in said corresponding end-user system.

The demand base paging system can further comprise a plurality of local host systems interconnected to said remote host system, and one or more groups of end-user systems corresponding to said local host systems, each of said groups being interconnected to a corresponding local host system. The paging system can also include a central file server configured to provide one or more pages of said data file from the remote host system to the local host system via the first communication link. Each of the first and the second communication links can comprise a plurality of network computers interconnected via transmission lines.

The invention can also be used in an environment that maintains a cache buffer in the local host system for storing a plurality of data pages. In such an embodiment, a cache manager is configured to determine if one or more data pages currently referenced by the request are available in the cache buffer in the local host system, and if said referenced data pages are available in the cache buffer (1) transmitting one or more of said data pages to the end user system, otherwise (2) retrieving the referenced pages from the remote host system to the local host system via the first communication link, (3) storing the referenced pages in the cache buffer in the local host system, and (4) transmitting the referenced pages from the local host system to the end-user system via the second communication link.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for accessing large data files In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

There is a need for a method of data transfer in a network system where only referenced portions of a requested data file are transferred from a server system to a client system. There is also a need for such a method to transfer said referenced portions efficiently. There is also a need for such a method to transfer said referenced portions by conserving network bandwidth. The present invention provides solutions to these needs.

Figure 1A:
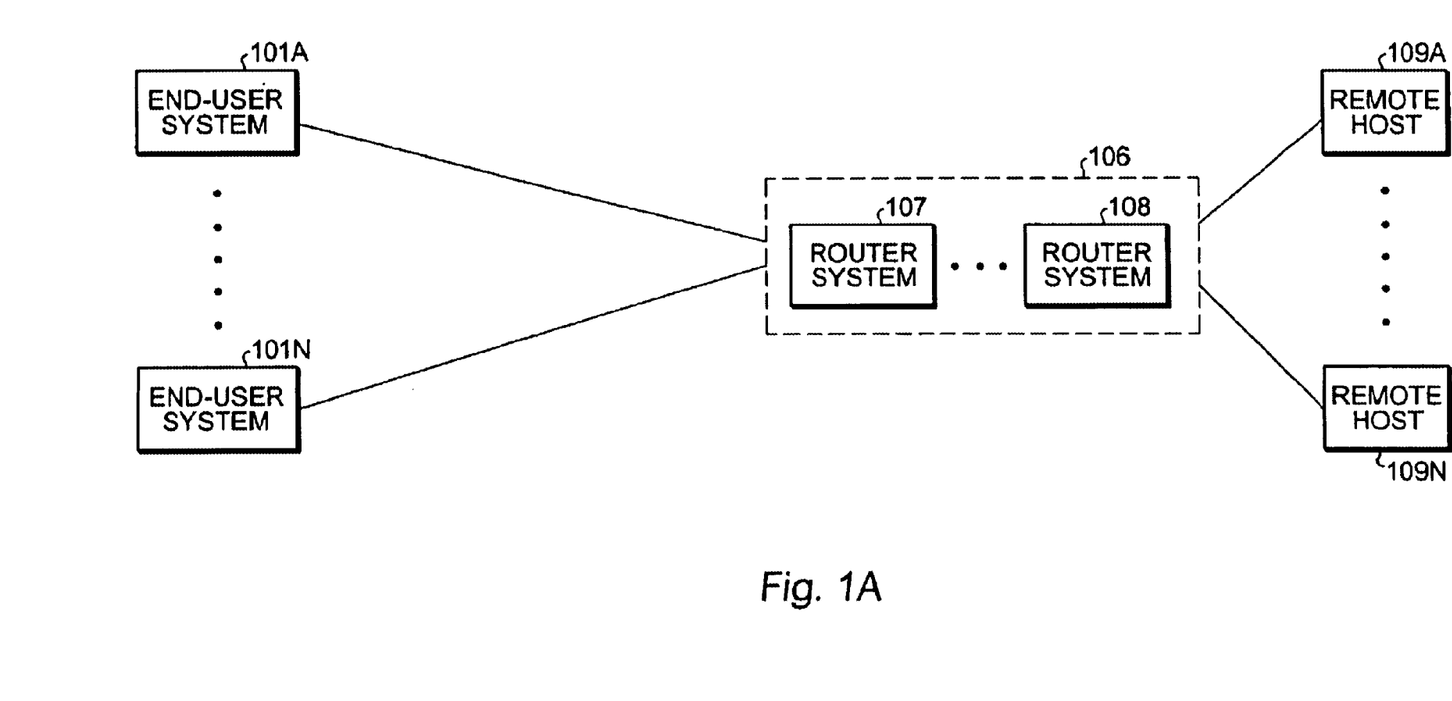
FIG. 1a shows a block diagram of an example network system architecture in which the present invention can be implemented.

FIG. 1a shows a block diagram of an example network system in which a method embodying an aspect of the present invention can be implemented. The network system typically includes at least one remote host system interconnected to at least one end-user systems a communication link. As those skilled in the art will recognize, the present invention is capable. of being implemented in a network system including other data processing systems, storage systems, interconnect topologies, and communication links for managing transfer of data therebetween. The communication link can include a plurality of network routers interconnected via transmission lines.

Figure 2:
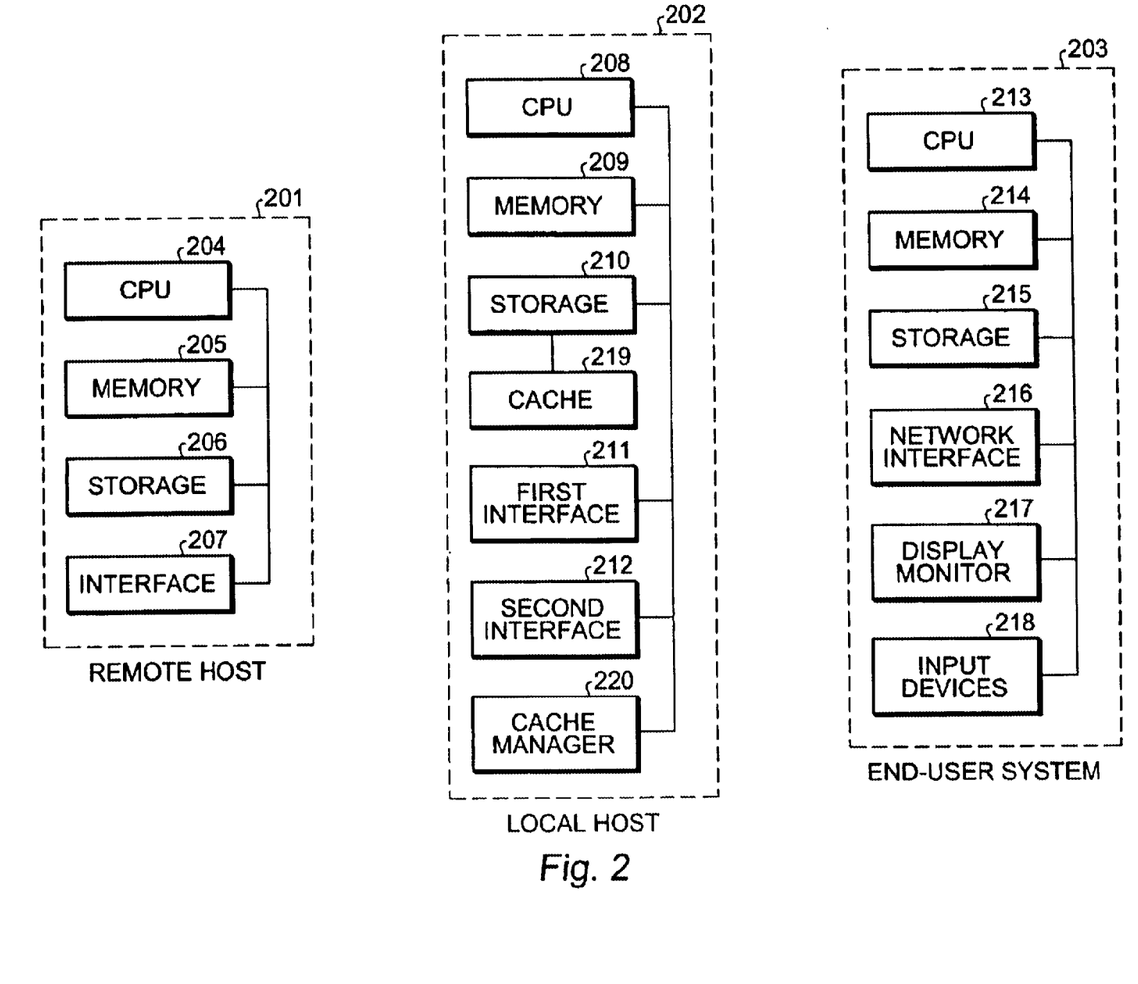
FIG. 2 shows block diagrams of a remote host system, a local host system and an end-user system.

Referring to FIG. 2, each remote host system includes a CPU, a memory device, a data storage and a network interface for controlling data communication via the communication link, interconnected via a bus as shown. At least one remote host system is configured as a file server, and one or more data files are stored in the data storage of the remote host system, wherein the remote host stem provides one or more pages of a selected data file through the communication link upon demand.

Each end-user system typically includes a CPU, a memory device, a storage device, a network interface for controlling data communication via the communication network, a display monitor, and user input devices, interconnected via a bus as shown. At least one end-user system is configured by a user interface supported by a browser to: (1) provide information to the end-user system for identifying each of the data files on the remote host system, (2) allow selection of one or more of said identified data files, and (3) generate requests for the selected data files.

Figure 3A:
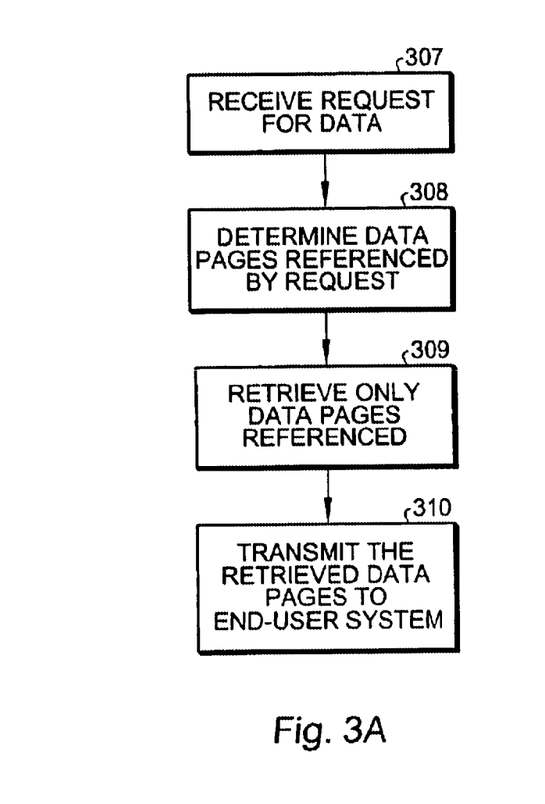
FIG. 3a shows a flowchart illustrating an example data transfer method in the network system of FIG. 1a according to an embodiment the present invention.

Referring to FIG. 3a, upon receiving a request (step 307), retrieving a requested data file includes determining one or more data pages currently referenced by the request (step 308); retrieving the referenced data pages from the remote host system (step 309); and transmitting the retrieved data pages to the end-user system via the communication link (step 310).

Advantageously, only data pages referenced by a user at the requesting end-user system are retrieved from the remote host system. A few previously-referenced pages can remain in the end-user system for future reference by the user, thereby relieving the remote host system from transmitting the same data pages to the end-user system every time the data pages are referenced.

Figure 4:
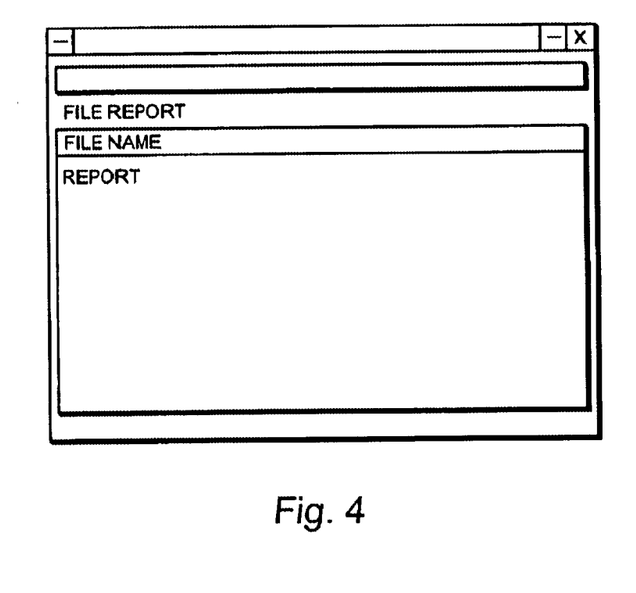
FIG. 4 shows an example computer screen displaying data file identification information according to an embodiment the present invention.
Figure 5:
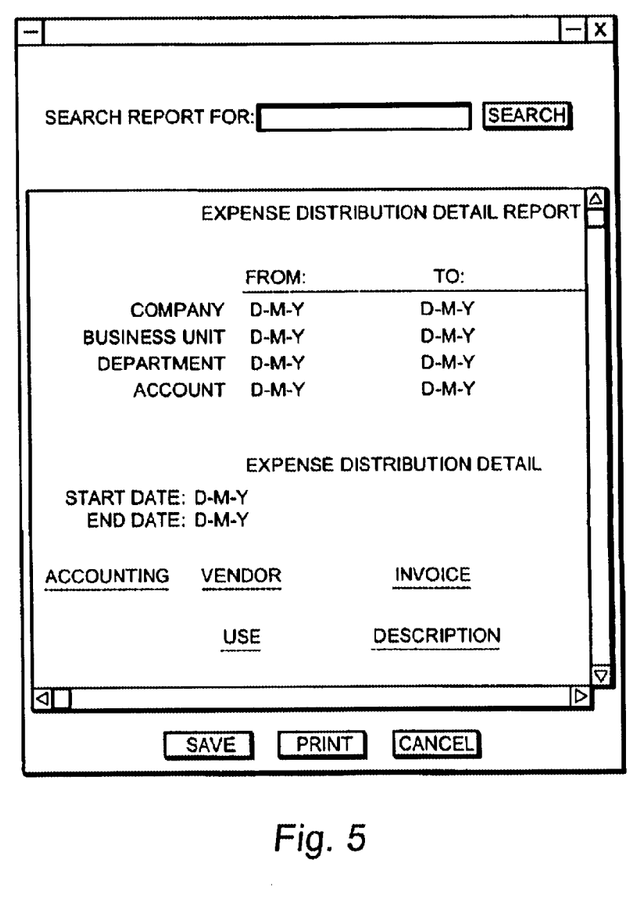
FIG. 5 shows an example computer screen illustrating a viewing window displaying a page of a requested data file according to an embodiment the present invention.

An end-user system can be a personal computer including communication means such as a modem configured by dial-up networking software for establishing a connection with the remote host system via the telephone lines. The user can select a report for viewing from a list of reports displayed on a display monitor as shown in FIG. 4. Data pages of a selected report or data file are retrieved from a remote host system or web-server and displayed on the display monitor by the browser in a viewing window as shown in FIG. 5. The viewing window includes a scroll bar, adjusted to provide the impression that the entire report is available to the user on the personal computer, or the user's desktop.

Therefore, when a user utilizes an end-user system to access data file in a remote host system, instead of downloading the complete data file from the remote host system, only first few pages of the data file are downloaded to the end-user system. When the user begins scrolling down, the end-user system requests additional data pages from the remote host system. There can be a limit on number of pages that can be loaded in the memory of the end-user system. As such, as user scrolls-down to succeeding pages, all but a few of the preceding pages are discarded from the memory of the end-user system to provide storage space for subsequent pages referenced by the user. If the user scrolls up to the preceding pages of the data file, the end-user system requests the referenced pages not in its memory from the remote host system.

Further, when the user issues a search for a particular string in the data file, the end-user system transmits the search string to the remote host system where the search is performed and appropriate data pages with the search string therein are transmitted to the end-user system for display to the user.

In one embodiment, the end-user system is configured to provide a front end Java based applet, described below, which is transparent to the user. The applet first obtains the size of the data file to control the cursor on the scroll bar of the end-user display screen. A such, the user is lead to believing that entire data file is downloaded in the end-user system. When the user moves the scroll bar up or down or clicks on the scroll bar, the appropriate data pages are downloaded to the end-user system and displayed.

For example, large data files can be partitioned into data pages of about 20 Kbytes each, wherein each page has a URL associated therewith. When a user requests a data file, said front end applet at the end-user system translates the data file request URL to the appropriate URL of the data pages referenced by the user. As such, the front end. applet controls downloading of the pages from the host system to the end-user system, which is transparent to the user. Further, when the user provides the search string, the front end applet sends the search string to the remote host system where a search is performed in the data file, and the index of each data page containing the string is returned to the front end applet in the end-user system. The front end applet translates each index into a correct page URL and downloads the data page from the host for display.

Because the number of data pages in the end-user browser are limited, it is possible that when user scrolls down, the earlier data pages are removed from the end-user memory. If the user scrolls up, the same data pages are downloaded from the remote web server. As discussed further below, if a local cache server is available, the local cache server can store several data pages therein. As such, it is likely that data pages fetched earlier are still in the local cache server. The end-user system or browser can fetch said data pages from the local cache server instead of the remote host system.

Figure 1B:
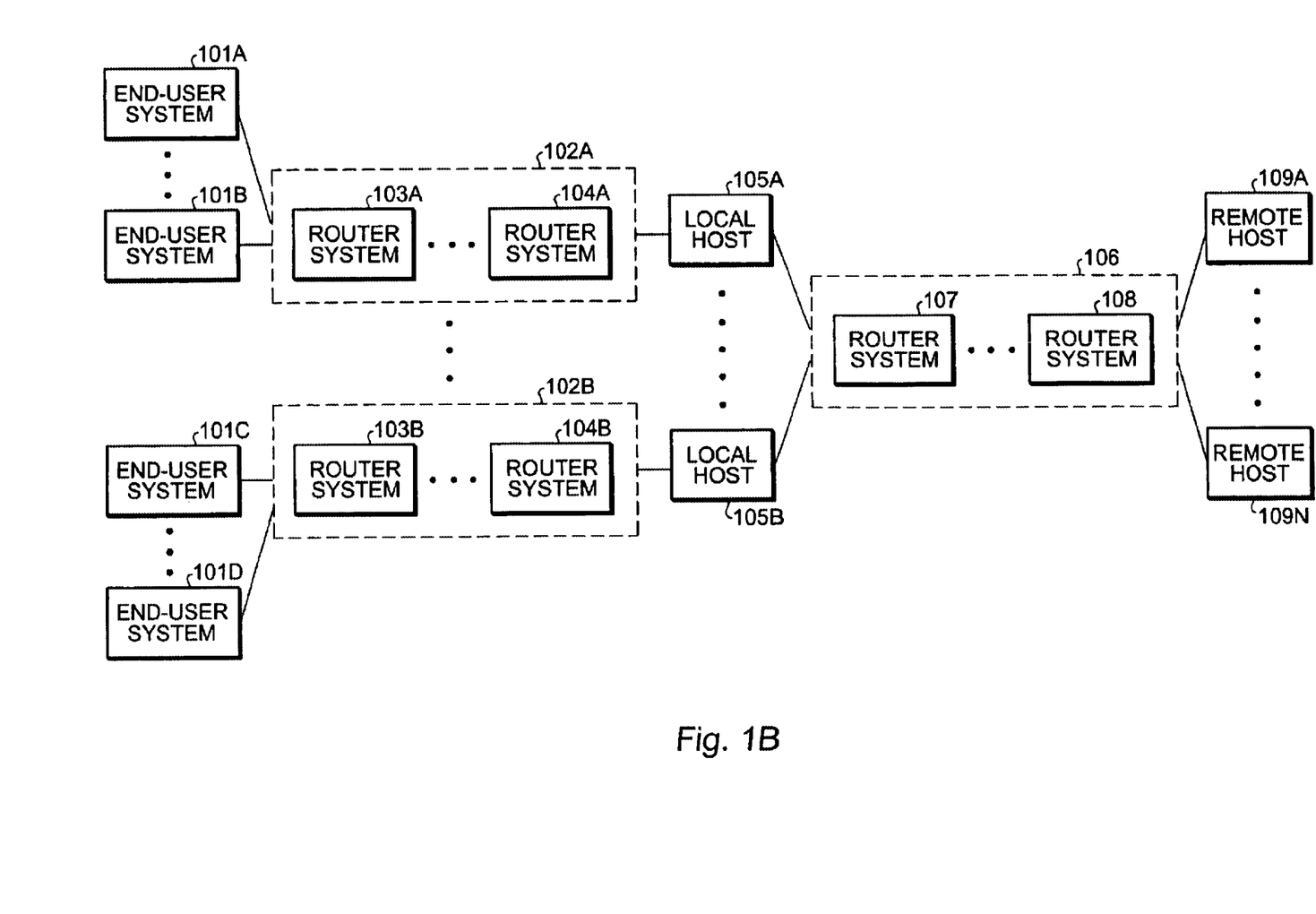
FIG. 1b shows a block diagram of another example network system architecture in which the present invention can be implemented.

FIG. 1b illustrates a block diagram of an example network system embodying another aspect of the present invention in which a method embodying aspects of the present invention can be implemented. The network system typically includes at least one remote host system 109A–109N interconnected to at least one local host system 105A–105B via a first communication link such as link 106 using one or more router systems exemplified by router systems 107 and 108. The example router system includes one or more end-user systems 101B interconnected to the local host system 105A via a second communication link 102A including one or more routers such as router systems 103A and 104A. Other end user systems such as systems 101C and 101D are connected to another local host such as 105B via communications link 102B including router systems 103B and 104B.

As those skilled in the art will recognize, the present invention is capable of being implemented in a network system including other data processing systems, storage systems, interconnect topologies, and communication links for managing transfer of data therebetween. The first and second communication links can include a plurality of network routers interconnected via transmission lines.

Referring to FIG. 2, an example remote host system 201 is illustrated that includes a CPU 204, a memory device 205, data storage 206 and a network interface 207 for controlling data communication via the first communication link, interconnected via a bus as shown. At least one remote host system 201 is configured as a file server, and one or more data files are stored in the data storage 206 of the remote host system 201, wherein the remote host stem provides one or more pages of a selected data file through the first communication link upon demand.

FIG. 2 also illustrates an example local host system 202 that includes a CPU 208, a memory device 209, data storage 210 including a local cache buffer 219, a first network interface 211 for controlling data communication via the first communication link, and a second network interface 212 for controlling data communication via the second communication link, interconnected via a bus as shown. At least one local host system 202 is configured as a cache-server system wherein a portion of the data storage device of the local host system 202 is utilized as a data buffer for storing pages of data retrieved from the remote host system 201.

An example end-user system 203 typically includes a CPU 213, a memory device 214, a storage device 215, a network interface 216 for controlling data communication via the second communication network, a display monitor 216, and user input devices 18, interconnected via a bus as shown. At least one end-user system 203 is configured by a user interface supported by a browser to: (1) provide information to the end-user system 203 for identifying each of the data files on the remote host system 201, (2) allow selection of one or more of said identified data files, and (3) generate requests for the selected data files.

Cache Manager Operation

Figure 3B:
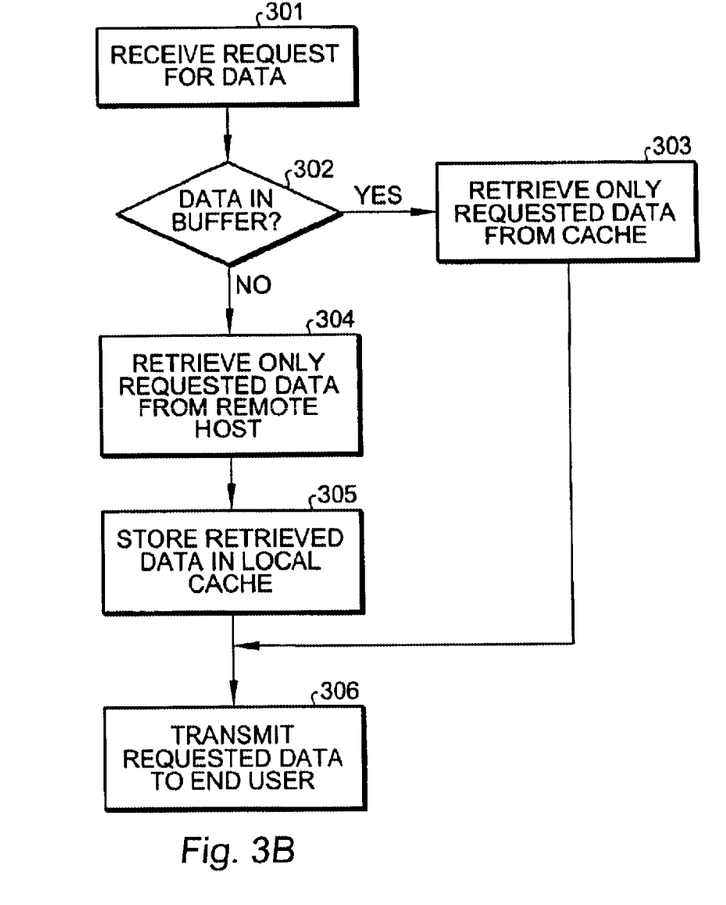
FIG. 3b shows a flowchart illustrating an example data transfer method in the network system of FIG. 1b according to another embodiment the present invention.

FIG. 3 is a flow diagram.of the operation of a cache manager of the local cache server that is one environment in which the present ivention can be used. At step 301, retrieving a requested data file includes determining at step 302 whether one or more data pages currently referenced by the request are available in the cache buffer in the local host system. If so, one or more available data pages from the cache buffer are transmitted at step 303 to the end-user system via the second communication link. However, if the referenced data pages are not available in the cache buffer, the referenced pages are retrieved from the remote host system at step 304 and provided to the local host system via the first communication link. The data is stored in the cache buffer at step 305, and also transmitted from the local host system to the end-user system via the second communication link at step 306.

Advantageously, only data pages referenced by a user at the requesting end-user system, and not already present in the cache buffer, are retrieved from the remote host system. Previously-referenced pages remain in the cache buffer at the local host for future reference by the user, thereby relieving the remote host system from transmitting the same data pages to the end-user system every time the data pages are referenced.

Other advantages of the method of the present invention can be observed from another example embodiment implemented using the Internet and providing a WWW demand-based-paging reporting system. Such a reporting system provides seamless access to reports stored on remote host systems such as legacy systems including, for example, IBM™ main frames and UNIX™ systems such as Solaris™. Report data can be stored as data files, including pages of data in ASCII form, in a remote host system such as a Sparc 1000 Solaris, wherein each page of data is configurable in size for thin-client devices such as personal computers. The data pages are sequentially numbered, such as 1, 2, etc., up to a desired maximum.

A user can access the reports via an end-user system such as a personal computer configured by a WWW browser such as provided by Netscape™. The personal computer is located in a particular domain and is interconnected to a local host system serving said domain via the second communication link. The personal computer includes communication means such as a modem configured by dial-up networking software for establishing a connection with the local host system via the telephone lines. The user can select a report for viewing from a list of reports displayed on a display monitor as shown in FIG. 4. The first few pages of the selected report are retrieved from the web-server and displayed on the display monitor by the browser in a viewing window as shown in FIG. 5.

The viewing window includes a scroll bar, adjusted to provide the impression that the entire report is available to the user on the personal computer, or the user's desktop. The data pages retrieved from the web-server are cached in the local host system configured as a cache-server, local to the user's domain. As the user scrolls on the displayed data, the scroll bar scales to a position corresponding to the offset in the report file stored on the web-server. All pages corresponding to advancing of the scroll bar are retrieved from the web-server and stored in the local cache-server: Only a page pertinent to a current scroll bar position is displayed in the viewing window.

If the user scrolls in the reverse direction, the data stored in the local cache-server is transmitted to the personal computer for viewing, rather than time and resource consuming retrieval from the web-server. As such, the method of the present invention allows the report data to be retrieved from the remote host system, cached in the local host system and viewed in the personal computer, thereby providing a network efficient demand paging scheme.

When a report is selected by a user located in a particular domain served by a local cache-server, the report data is transmitted from the web-server over the Internet to the local-cache server, only once on demand. Where the local cache-server is interconnected to multiple end-user systems in said domain, and several users in the said domain request the same report, subsequent requests for the report are serviced by the local cache-server utilizing report data stored in the local cache buffer, rather than by repeatedly retrieving the subsequently referenced report data from the web-server. As such, the present invention provides significant reduction in network bandwidth requirements and usage.

The local cache-server is configured by a cache system including said cache buffer and a cache manager. The cache buffer is used as a memory buffer between the remote host system and the end-user systems, to store at least the referenced portions of data reports stored in the remote host system. The cache manager controls transfer of data from the remote host system into the cache buffer, and manages the data stored in the cache buffer. The cache manager utilizes a cache directory containing data page file addresses, such as sequence numbers, and control bits for cache management and access control. The cache manager searches the cache directory for performing function such as retrieving data pages from the remote host system, storing data blocks in the cache buffer, and providing data pages to the end-user systems. The cache manger can also utilize a replacement strategy to determine which data pages to retain in the cache buffer and which to discard.

In another aspect of the present invention, each of a plurality of local host systems is configured as a cache-server and is interconnected to several end-user systems corresponding to a particular domain. For example, a first cache-server can provide service to several end-user systems in a domain for Germany, a second cache-server can provide service to several end-user systems in a domain for Japan, and a third cache-server can provide service to several end user-systems in a domain for Belgium. The first and the second cache-servers can be to a web-server in the United States, and the third cache-server can be interconnected to a web-server in England and a web-server in Canada.

When a first end-user system in a domain corresponding to Germany requests a data file on the web-server in the U.S., the cache-server for Germany determines if data pages referenced by the request are in the cache-server's cache buffer. If so, the referenced pages are transmitted to the end-user system from the cache buffer. Otherwise, the referenced data pages are retrieved from the web-server in the U.S., stored in the cache-server's cache buffer and transmitted to the requesting end-user system. Subsequently, when a second end-user system in the domain corresponding to Germany racquets the same data file, and references data pages previously referenced by the first end-user system, the subsequently referenced data pages are transmitted to the second end-user system from the cache buffer of the cache-server in Germany, rather than being retransmitted from the web-server in the U.S.

Similarly, when a first end-user system in a domain corresponding to Japan requests a data file on the web-server in the U.S., the cache-server for Japan determines if data pages referenced by the request are in the cache-server's cache buffer. If so, the referenced pages are transmitted to the end-user system from the cache buffer. Otherwise, the referenced data pages are retrieved from the web-server in the U.S., stored in the cache-server's cache buffer and transmitted to the requesting end-user system. Subsequently, when a second end-user system in the domain corresponding to Japan racquets the same data file, and references data pages previously referenced by the first end-user system, the subsequently referenced data pages are transmitted to the second end-user system from the cache buffer of the cache-server in Japan, rather than being retransmitted from the web-server in the U.S.

The cache system in each cache-server allows cache buffering of several different data files in the cache buffer of the cache-server. In one embodiment of the cache system, the cache manager partitions the cache buffer into several segments, each corresponding to one of several different data files. Therefore, for example, when a first end-user system in the domain corresponding to Belgium requests a first data file on the web-server in England, the cache-server for Belgium determines if data pages referenced by the request are in a first segment of the cache-server's cache buffer for the first data file. If so, the referenced pages are transmitted to the end-user system from the first segment of the cache buffer. Otherwise, the referenced data pages are retrieved from the web-server in England, stored in the first segment of the cache buffer and transmitted to the requesting end-user system.

Subsequently, when a second end-user system in the domain corresponding to Belgium requests a second data. file on the web-server in England, the cache-server for Belgium determines if data pages referenced by the request are in a second segment of the cache-server's cache buffer for the second data file. If so, the referenced pages are transmitted to the end-user system from the second segment of the cache buffer. Otherwise, the referenced data pages are retrieved from the web-server in England, stored in the second segment of the cache buffer and transmitted to the requesting end-user system.

Thereafter, when a third end-user system in the domain corresponding to Belgium requests a third data file on the web-server in Canada, the cache-server for Belgium determines if data pages referenced by the request are in a third segment of the cache-server's cache buffer for the third data file. If so, the referenced pages are transmitted to the end-user system from the third segment of the cache buffer. Otherwise, the referenced data pages are retrieved from the web-server in Canada, stored in the third segment of the cache buffer and transmitted to the requesting end-user system. Other known methods of cache buffering of different data files are also possible and contemplated by the present invention.

The method of present invention can be implemented by computer program instructions utilizing Java and Java applets. Other programming languages such as C, C++ and Pascal can also be utilized. A Java applet comprises an application program utilizing the object-oriented Java programming language, designed for use in distributed systems such as the Internet and the World Wide Web. Java can be utilized to create application programs which can run on a single computer system or be distributed among several servers and clients in a network system. Java can also be utilized to create small application program modules or applets for use as part of a Web page.

As such, a Java applet can be transmitted along a Web page from a server to a user system and the applet can perform interactive operations, calculations, data communication and the like, without having to send a user request back to the server. Said application programs are complied into a Java bytecode that can be executed by computer systems in a network or on a server or a client system having Java virtual machines. The Java virtual machine interprets the bytecodes into code for execution by the underlying computer hardware. As such, individual computer systems having different operating platforms such as instructions length can be accommodate locally.

Utilizing Java as the underlying technology for implementing the present invention, including storing and transmitting report data, results in more efficient integration of various legacy systems. Further, displaying the report data in the viewing window as described above can be implemented as Java applets. The Java applets operationally scale well for various Java stations including thin-client systems which impose small memory-footprint requirements. Because only a few pages of the report data can be effectively displayed in the viewing window at a given time, the present invention can be easily scaled and implemented in thin-client end-user systems such as network-computers, hand-held devices, and the like. Further, since the report data is pulled from the Web-server on demand, the method of the present invention functions efficiently for Java stations in thin clients with limited memory.

Although the present invention has been described in considerable detail with regard to the preferred versions thereof, other versions are possible. Therefore, the appended claims should not be limited to the descriptions of the preferred versions contained herein.

Embodiment of Computer Execution Environment (Hardware)

Figure 6:
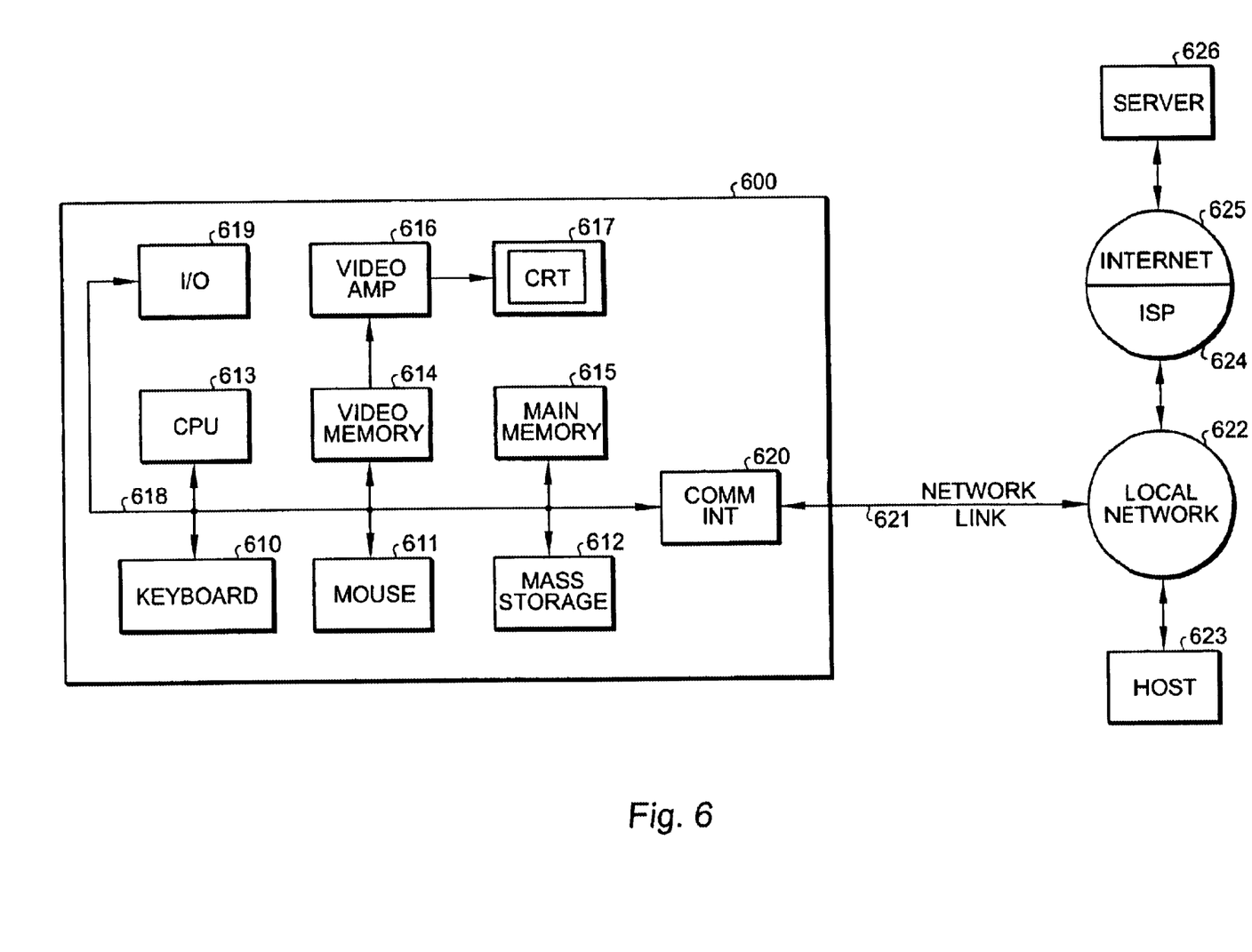
FIG. 6 illustrates an example computer system for implementing the invention.

An embodiment of the invention can. be implemented as computer software in the form of computer readable code executed on a general purpose computer such as computer 600 illustrated in FIG. 6, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 610 and mouse 611 are coupled to a system bus 618. The keyboard and mouse are for introducing user input to the computer system and communicating that user input to processor 613. Other suitable input devices may be used in addition to, or in place of, the mouse 611 and keyboard 610. I/O (input/output) unit 619 coupled to system bus 618 represents such I/O. elements as a printer, A/V (audio/video) I/O, etc.

Computer 600 includes a video memory 6i4, main memory 615 and mass storage 612, all coupled to system bus 618 along with keyboard 610, mouse 611 and processor 613. The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 64-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 600 may also include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by an Internet Service Provider (ISP) 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Computer 600 can send messages and receive data, including program code, through the network(s), network link 621, and communication interface 620. In the Internet example, remote server computer 626 might transmit a requested code for an application program through Internet 625, ISP 624, local network 622 and communication interface 620.

The received code may be executed by processor 613 as it is received, and/or stored in mass storage 612, or other non-volatile storage for later execution. In this manner, computer 600 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for accessing web servers is described in conjunction with one or more specific embodiments. The invention is defined by the claims and their full scope of equivalents.

What is claimed is:

1. In a network system comprising a remote host system interconnected to at least one end-user system via a communication link, a method of retrieving portions of a data file from the remote host system to the end-user system on demand, wherein the data file includes pages of data, comprising:

(a) receiving a request from an end-user system for the data file;
   (b) determining one or more data pages currently referenced by the request based upon the location of a scroll bar within an end-user viewing window, adjusted to provide the impression that the entire data file is available to the end-user;
   (c) retrieving the one or more referenced data pages from the remote host system; and
   (d) transmitting the retrieved data pages to the end user system via the communication link, such that the end-user believes that the entire data file is downloaded to the end-user system and displayed.

2. The method of claim 1, wherein the remote host system contains a plurality of data files each comprising pages of data.

3. The method of claim 2, further comprising the steps of:
   (a) providing information to said end-user systems for identifying each of said data files on the remote host system; and
   (b) allowing selection of one or more of said identified data files.

4. The method of claim 3, wherein at least one end-user system includes display means, and wherein the step of selecting a data file further includes displaying one or more pages of the data file on said display means.

5. The method of claim 1, wherein the remote host system comprises a central file server system.

6. The method of claim 1, wherein each page of the data file is configurable in size.

7. The method of claim 1, wherein the communication link comprises a plurality of network computers interconnected via transmission lines.

8. The method of claim 1, wherein the second communication link comprises a plurality of network computers interconnected via transmission lines.

9. The method of claim 1, wherein the communication link comprises the Internet.

10. The method of claim 9, wherein the end-user system is configured by a Web browser for downloading data pages from the remote host system and displaying said data pages on a display system.

11. A demand based paging system in a network system comprising a remote host system interconnected to at least one end-user system via a communication link, the demand paging system configured for retrieving portions of a data file in the remote host system to said end-user system on demand, wherein the data file includes pages of data, the demand based paging system comprising:

(a) a request processor configured to receive a request from an end-user system for the data file;
   (b) means for determining one or more data pages of the data file currently referenced by the request based upon the location of a scroll bar within an end-user viewing window, adjusted to provide the impression that the entire data file is available to the end-user;
   (c) means for retrieving the one or more referenced data pages from the remote host system; and
   (d) means for transmitting the retrieved data pages to the end user system via the communication link, such that the end-user believes that the entire data file is downloaded to the end-user system and displayed.

12. The demand based paging system of claim 11, wherein the remote host system contains a plurality of data files each comprising pages of data.

13. The demand based paging system of claim 12, further comprising a user interface for each end-user system, wherein each user interface is configured to (1) provide information to the corresponding end-user system for identifying each of said data files on the remote host system, (2) allow selection of one or more of said identified data files, and (3) and generate requests for the selected data files.

14. The demand based paging system of claim 13, wherein said user interface is further configured to display one or more pages of a selected data file on a display means in said corresponding end-user system.

15. The demand based paging system of claim 11, wherein each page of the data file is configurable in size.

16. The demand based paging system of claim 11, wherein the communication link comprises a plurality of network computers interconnected via transmission lines.

17. In a network system comprising a remote host system interconnected to at least one local host system via a first communication link, and one or more end-user systems interconnected to the local host system via a second communication link, a method of retrieving portions of a data file from the remote host system to said end-user systems on demand, wherein the data file includes pages of data, comprising:

(a) maintaining a cache buffer in the local host system for storing a plurality of data pages;

(b) receiving a request from an end-user system for the data file based upon the location of a scroll bar within an end-user viewing window, adjusted to provide the impression that the entire data file is available to the end-user;

(c) determining whether one or more data pages currently referenced by the request are available in the cache buffer in the local host system; and (d) if so, transmitting one or more available data pages from the cache buffer to the end user system, otherwise: (1) retrieving the referenced pages from the remote host system to the local host system via the first communication link, (2) storing the referenced pages in the cache buffer in the local host system, and (3) transmitting the referenced pages from the local host system to the end-user system via the second communication link, such that the end-user believes that the entire data file is downloaded to the end-user system and displayed.

18. The method of claim 17, wherein the remote host system contains a plurality of data files each comprising pages of data.

19. The method of claim 18, further comprising the steps of:

(a) providing information to said end-user systems for identifying each of said data files on the remote host system; and (b) allowing selection of one or more of said identified data files.

20. The method of claim 19, wherein at least one end-user system includes display means, and wherein the step of selecting a data file further includes displaying one or more pages of the data file on said display means.

21. The method of claim 17, wherein the network system comprises:

(a) a plurality of local host systems interconnected to said remote host system, and (b) one or more groups of end-user systems corresponding to said local host systems, each of said groups being interconnected to a corresponding local host system.

22. The method of claim 17, wherein the remote host system comprises a central file server system, and wherein the local host system comprises a file cache system.

23. The method of claim 17, wherein each page of the data file is configurable in size.

24. The method of claim 17, wherein the first communication link comprises a plurality of network computers interconnected via transmission lines.

25. The method of claim 17, wherein the second communication link comprises a plurality of network computers interconnected via transmission lines.

26. In a network system comprising a remote host system, one or more local host systems, and a plurality of end-user systems, all capable of being interconnected via the Internet, wherein the end-user systems are grouped into one or more domains each corresponding to a local host system, a method of retrieving portions of a data file from the remote host system to an end-user system on demand, wherein the data file includes pages of data, comprising:

(a) maintaining a cache buffer in each local host system for storing a plurality of data pages;

(b) receiving requests from one or more end-user systems in a domain for the data file based upon the location of a scroll bar within an end-user viewing window, adjusted to provide the impression that the entire data file is available to the end-user; and (c) for each request performing steps including:

(1) determining whether one or more data pages currently referenced by the request are available in the cache buffer of the local host system corresponding to said domain; and (2) if so, transmitting one or more available data pages from the cache buffer to the requesting end user system, otherwise: (i) retrieving the referenced pages from the remote host system to the local host system, (ii) storing the referenced pages in the cache buffer in the local host system, and (iii) transmitting the referenced pages from the local host system to the requesting end-user system, such that the end-user believes that the entire data file is downloaded to the end-user system and displayed.

27. The method of claim 26, wherein the remote host system contains a plurality of data files each comprising pages of data.

28. The method of claim 27, further comprising the steps of:

(a) providing information to said end-user systems for identifying each of said data files on the remote host system; and (b) allowing selection of one or more of said identified data files.

29. The method of claim 28, wherein at least one end-user system includes display means, and wherein the step of selecting a data file further includes displaying one or more pages of the data file on said display means.

30. The method of claim 26, wherein the remote host system comprises a central file server system, and wherein each local host system comprises a domain cache server.

31. The method of claim 26, wherein each end-user system is configured by a Web browser for downloading data pages from a local host system and displaying said data pages on a display system.

* * * * *